3,055,802
TOXICANT PREMIX
Frank H. Lyons, Memphis, Tenn., assignor, by mesne assignments, to E. L. Bruce Co. (Incorporated), a corporation of New York
No Drawing. Filed Nov. 18, 1959, Ser. No. 853,698
5 Claims. (Cl. 167—42)

This invention relates to a toxicant premix which is adapted to form an emulsion when added to water and thus is adapted to form a preparation useful for treating, for example, soil to prevent insects such as termites and the like passing through the soil to a structure adjacent to the soil.

It has long been a problem to provide a toxicant preparation which is equally effective under both wet and dry conditions and which will at the same time provide a continuous and thorough covering of the surface being treated. With respect to the latter problem it has long been desired to eliminate from such preparations the commonly employed petroleum solvents which on evaporation cause the toxicant film which has been applied to break up due to either a stretching of the film or crystallizing of the toxicant. A solution to this problem further required that the premix be reasonably non-corrosive to its container which normally is metal.

The premix in accordance with this invention solved all of the above discussed problems. It is further highly advantageous since it provides when admixed with water a preparation which has excellent wetting properties and which applies an excellent film of toxicant to soil. In addition the premix is further superior in that when admixed with water it provides a preparation which readily penetrates fill such as the type of fill that a slab foundation may rest on, a very useful property for treating slab foundations to prevent their penetration by termites and the like.

The toxicant premix in accordance with this invention contains octachloro-methano-tetrahydroindane in an amount of from about 40 to 60 parts by weight. From about 4.5 to about 25.5 parts by weight of hexachloroepoxyoctahydroendo,exo-dimethano-naphthalene is dissolved in the octachloro-methono-tetrahydroindane which is always present in an amount sufficient to dissolve the hexachloroepoxyoctahydroendo,exo-dimethano-naphthalene employed. In addition the premix contains a phenoxypolyethoxyethanol emulsifier, for example, nonylphenoxypolyethoxyethanol or octylphenoxypolyethoxyethanol or their sodium sulfonates. Advantageously, a mixture of equal weights of nonylphenoxypolyethoxyethanol and octylphenoxypolyethoxyethanol sodium sulfonate is employed. The emulsifier will be present in an amount of from about 15 parts to about 30 parts by weight. If desired an alkoxy alkanol such as butoxyethanol which functions as a coupling agent between the toxicant and the emulsifier may be added in an amount of from about 5 to about 10 parts by weight.

The premix contains only one solvent which is the octachloro-methano-tetrahydroindane. In being free of petroleum solvents, it provides a highly superior toxicant film when employed in conjunction with water. The absence of water from the premix substantially reduces its corrosiveness.

The premix is readily prepared using conventional techniques by first dissolving the hexachloroepoxyoctahydroendo,exo-dimethano-naphthalene in the octachloro-methanotetrahydroindane and then adding the emulsifier and the alkoxy alkanol if employed and thoroughly mixing these ingredients with the octachloro-methano-tetrahydroindane-hexachloroepoxyoctahydro-endo,exo-dimethano-naphthalene solution.

When it is desired to make a toxicant preparation for application, for example, to soil, the premix is added to water with stirring which results in the formation of an emulsion. Advantageously the water will be employed in an amount of from about 20 to about 80 times the weight of the premix. The thus formed toxicant emulsion preparation can be applied by any of the techniques conventionally employed such as by spraying or rodding. As discussed above it has excellent properties with respect to penetrating fill and hence can be flowed into the fill on which a slab foundation rests to provide for the placement of a toxicant film throughout the fill or the capillary break-pad resting on top of the fill. The desired toxicant film is formed simply on air drying.

The invention will be further clarified by reference to the following specific examples.

Example I

A one hundred pound batch of premix is made on the following formula:

| | Parts by weight |
|---|---|
| Octachloro-methano-tetrahydroindane | 52.1 |
| Hexachloroepoxyoctahydro - endo,exo - dimethano-naphthalene | 16.6 |
| An equal mixture of nonylphenoxypolyethoxyethanol and octylphenoxypolyethoxyethanol sodium sulfonate | 26.3 |
| Butoxyethanol | 5 |

The hexachloroepoxyoctahydro - endo,exo - dimethano-naphthalene is dissolved in the octachloro-methano-tetrahydroindane and the phenoxypolyethoxyethanol mixture together with the butoxyethanol is then added and thoroughly mixed with the octachloro-methano-tetrahydroindane - hexachloroepoxyoctahydro-endo,exo-dimethano-naphthalene solution. The thus formed premix is then filled into five gallon cans.

As illustrative of the use of the premix, a five gallon can of premix prepared as above is added to 330 gallons of water with stirring to form an emulsion. The emulsion is then ready for application to foundation walls, dirt fills, capillary break-pads, or the like.

What is claimed is:

1. A toxicant premix adapted to form an emulsion when added to water comprising from 40 to 60 parts by weight of octachloro-methano-tetrahydroindane, from 4.5 to 25.5 parts by weight of hexachloroepoxyoctahydro-endo,exo-dimethano-naphthalene dissolved in said octachloro-methano-tetrahydroindane, and from 15 to 30 parts by weight of a phenoxypolyethoxyethanol emulsifier.

2. A toxicant premix adapted to form an emulsion when added to water consisting essentially of from 40 to 60 parts by weight of octachloro-methano-tetrahydroindane, from 4.5 to 25.5 parts by weight of hexachloroepoxyoctahydro - endo,exo - dimethano-naphthalene dissolved in said octachloro-methano-tetrahydroindane, and from 15 to 30 parts by weight of a phenoxypolyethoxyethanol emulsifier, the said octachloro-methano-tetrahydroindane being the only solvent in the premix for the hexachloroepoxyoctahydro - endo,exo - dimethano-naphthalene.

3. A toxicant premix adapted to form an emulsion when added to water comprising from 40 to 60 parts by weight of octachloro-methano-tetrahydroindane, from 4.5 to 25.5 parts by weight of hexachloroepoxyoctahydro-endo,exo-dimethano-naphthalene dissolved in said octachloro-methano-tetrahydroindane, and from 10 to 25 parts by weight of a phenoxypolyethoxyethanol emulsifier, from 5 to 10 parts by weight of an alkoxy alkanol, the said octachloro-methano-tetrahydroindane being the only solvent in the premix for the hexachloroepoxyoctahydro-endo,exo-dimethano-naphthalene.

4. A toxicant premix adapted to form an emulsion when added to water consisting essentially of from 40 to 60 parts by weight of octachloro-methano-tetrahydroindane, from 4.5 to 25.5 parts by weight of hexachloroepoxyoctahydro - endo,exo - dimethano-naphthalene dissolved in the octachloro-methano-tetrahydroindane, from 15 to 30 parts by weight of an equal mixture by weight of nonylphenoxypolyethoxyethanol and octylphenoxypolyethoxyethanol sodium sulfonate, the said octachloromethano-tetrahydroindane being the only solvent in the premix for the hexachloroepoxyoctahydro-endo,exo-dimethano-naphthalene.

5. A toxicant premix adapted to form an emulsion when added to water consisting essentially of from 40 to 60 parts by weight of octachloro-methano-tetrahydroindane, from 4.5 to 25.5 parts by weight of hexachloroepoxyoctahydro - endo,exo - dimethano-naphthalene dissolved in the octachloro-methano-tetrahydroindane, from 10 to 25 parts by weight of an equal mixture by weight of nonylphenoxypolyethoxyethanol and octylphenoxypolyethoxyethanol sodium sulfonate, from 5 to 10 parts by weight of butoxyethanol, the said octachloro-methano-tetrahydroindane being the only solvent in the premix for the hexachloroepoxyoctahydro - endo,exo - dimethano-naphthalene.

References Cited in the file of this patent

UNITED STATES PATENTS

| | | |
|---|---|---|
| 2,696,453 | Sanders | Dec. 7, 1954 |
| 2,819,996 | Riley | Jan. 14, 1958 |
| 2,898,267 | Lindner | Aug. 4, 1959 |
| 2,915,559 | Harsley | Dec. 1, 1959 |

OTHER REFERENCES

Shepard: The Chemistry and Action of Insecticides, 1st Ed., pub. by McGraw-Hill Book Co., New York, 1951, pp. 321–2.

De Ong: Chemistry and Uses of Pesticides, 2nd Ed., Reinhold Publishing Corp., New York, 1956, pp. 202–3.

McCutcheon: Synthetic Detergents up to date II, Part II, Soap and Sanitary Chemicals 28:8, August 1952, pp. 59–60.

Roark: Digest of Information on Chlordane by R. C. Roark, U.S. Dept. of Agri. Bur. of Entomology and Plant Quarantine, Agr. Res. Adm., April 1951, p. 11.

Handbook of Aldrin, Dieldrin and Endrin Formulations—Shell Chemical Corp., December 1954, p. 43.